United States Patent [19]
Barney et al.

[11] Patent Number: 5,128,796
[45] Date of Patent: Jul. 7, 1992

[54] CRYOGENIC SHUTTER

[75] Inventors: Richard D. Barney; Thomas J. Magner, both of Laurel, Md.

[73] Assignee: The United States of America as represented by the Administrator of the National Aeronautics and Space Administration, Washington, D.C.

[21] Appl. No.: 613,188

[22] Filed: Nov. 15, 1990

Related U.S. Application Data

[62] Division of Ser. No. 331,119, Mar. 31, 1989, Pat. No. 4,995,700.

[51] Int. Cl.$^5$ ............................................. G02B 26/02
[52] U.S. Cl. ................................. 359/236; 359/230
[58] Field of Search ........................... 350/589-590, 350/266, 269-273, 276 R, 276 SL, 321; 250/398, 492.1, 234-236, 252.1; 62/239-263, 428, 507, 55.5, 56; 354/154, 246; 355/298, 299; 359/227-236, 601-614, 896

[56] References Cited

U.S. PATENT DOCUMENTS

| | | | |
|---|---|---|---|
| 4,446,372 | 5/1984 | Gurnee | 250/334 |
| 4,475,349 | 10/1984 | Batzer et al. | 62/55.5 |
| 4,479,361 | 10/1984 | Osher | 62/55.5 |
| 4,531,372 | 7/1985 | Slabaugh | 62/55.5 |
| 4,592,083 | 5/1986 | O'Brien | 378/160 |
| 4,725,127 | 2/1988 | Malinge et al. | 350/269 |
| 4,778,254 | 10/1988 | Gilliland, III et al. | 350/269 |
| 4,799,767 | 1/1989 | Woodruff | 350/269 |
| 4,820,923 | 4/1989 | Wellman | 359/614 |
| 4,880,293 | 11/1989 | Gilliland, III et al. | 350/269 |
| 4,929,831 | 5/1990 | Flesner et al. | 250/252.1 |
| 4,929,834 | 5/1990 | Liebson | 350/276 SL |
| 4,990,782 | 2/1991 | Wellman et al. | 359/614 |

OTHER PUBLICATIONS

Thomas J. Magner and Richard D. Barney, "Interferometric Phase Measurement of Zerodur, Aluminum and SXA Mirrors at Cryogenic Temperatures", Apr. 4-5, 1988, pp. 29-37, published in Proceedings of the International Society for Optical Engineering, vol. 929.

Primary Examiner—Bruce Y. Arnold
Assistant Examiner—Thong Nguyen
Attorney, Agent, or Firm—Paul S. Clohan, Jr.; R. Dennis Marchant; Guy M. Miller

[57] ABSTRACT

A magnetically operated shutter mechanism is provided that will function in cryogenic or cryogenic zero gravity environments to selectively block radiation such as light from passing through a window to a target object such as a mirror or detector located inside a cryogenic container such as a dewar. The mechanism includes a shutter paddle blade that is moved by an electromagnetically actuated torquing device between an open position where the target object is exposed to ambient radiation or light and a closed position where the shutter paddle blade shields the ambient radiation or light from the target object. The purpose of the shuttering device is to prevent the mirror or other target object from being directly exposed to radiation passing through the window located on the side wall of the dewar, thereby decreasing or eliminating any temperature gradient that would occur within the target object due to exposure to the radiation. A special nylon bearing system is utilized to prevent the device from binding during operation and the paddle blade is also thermally connected to a reservoir containing the cryogen to further reduce the internal temperature.

9 Claims, 5 Drawing Sheets

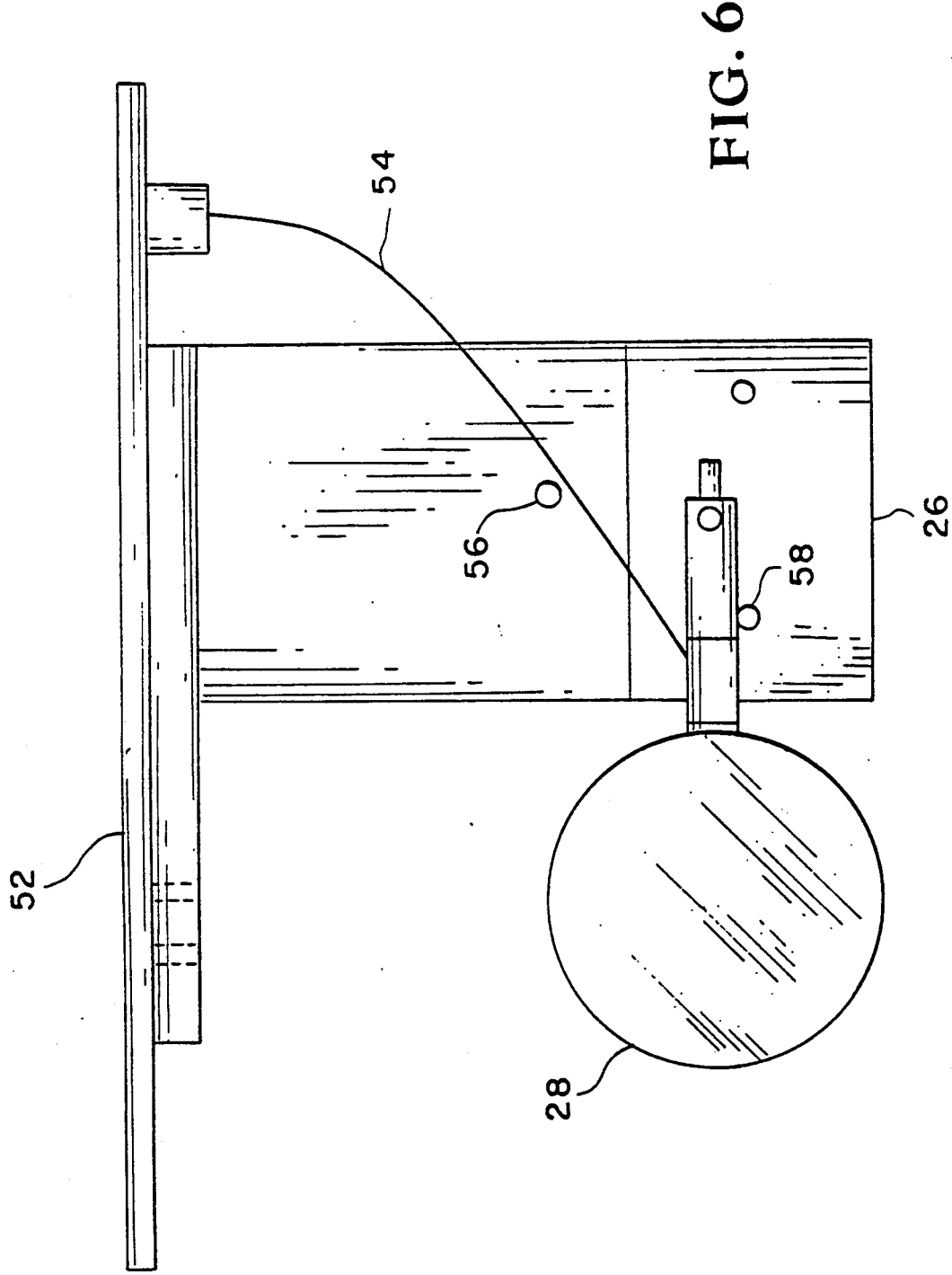

CRYOGENIC SHUTTER

ORIGIN OF THE INVENTION

The invention described herein was made by employees of the United States Government and may be manufactured and used by or for the Government for governmental purposes without the payment of any royalties thereon or therefore.

This is a division of application Ser. No. 331,119, filed Mar. 31, 1989, now U.S. Pat. No. 4,995,700.

FIELD OF THE INVENTION

The present invention relates generally to a cold moveable shield for shuttering an aperture through which radiation such as light is to pass, or a visual inspection is to be made, wherein the device will operate in a very cold environment (below 273K.). More specifically, this invention relates to an electromagnetically controllable shuttering device for shielding mirrors or cold detectors located inside an evacuated cryogenic container from ambient radiation, thereby decreasing or eliminating the temperature gradient within the mirror or detector.

BACKGROUND OF THE INVENTION

It is known in the art to provide a shutter mechanism for moving a shutter blade or other such component between spaced apart first and second end positions by magnetic force. For instance, electromagnets have been used to move a shutter blade between a first position which allows light to pass through an unshuttered aperture, to a second position which prevents the passage of light through the aperture. However, when such devices are to operate in a zero gravity environment or in an environment at reduced temperatures including cryogenic temperatures (down to 1.2K.), because of the extremely cold temperatures, no devices have been found to perform or function successfully until now.

Engineers and scientists at NASA working in the area of technology related to satellites and spacecraft that use optical elements such as mirrors or detectors for cryogenic infrared telescopes and cameras have long sought a test device in which they could check to assure that the mirrors had an accurate and stable surface figure at cold operating temperatures. In the past mechanical shutter systems have been utilized for that testing; however, the mechanical shutter systems had to pierce or be installed through the shell of an evacuated cryogenic dewar that was used for conducting such tests. The mechanical shutter systems also had to pierce various internal cryogenic shields such as liquid nitrogen and helium shrouds. This posed many problems with maintaining an adequate vacuum due to vacuum component leaks, and also maximizing the cooling of the dewar because of the lack of an adequate thermal isolation which causes an increase in coolant boil-off. In addition, the mechanical feed through components tended to stick or lock and malfunction at low temperatures. Installation of the mechanical feed through components also required difficult and expensive system assembly and disassembly. The electrically actuated, magnetically operated cryogenic shutter disclosed herein eliminated the many problems associated with the mechanical shutter system.

SUMMARY OF THE INVENTION

It is therefore an object of the present invention to provide an improved electromagnetically operated shutter mechanism that will operate as a cryogenic moveable shield in any cold environment or cryogenic zero gravity environment.

It is another object of the present invention to provide an improved cryogenic dewar system for decreasing or eliminating the temperature gradients in objects such as mirrors or detectors functioning at cryogenic temperatures that may be viewed through a window located on the wall of the dewar container.

It is still a further object of the invention to provide an improved cryogenic dewar for checking the accuracy of the surface figure of mirrors operating at cryogenic temperatures.

It is still a further object of the invention to provide an improved cryogenic dewar for checking the efficiency of cold detectors operating at cryogenic temperatures.

It is still a further object of the invention to provide an improved cryogenic dewar for checking the characteristics of cryogenic optical elements such as optical filters, polarizers or beamsplitters, thin films or optical coatings operating at cryogenic temperatures.

It is still a further object of the invention to provide an improved cryogenic dewar for checking the characteristics of cryogenic mechanisms such as high speed choppers or shutters and focusing elements.

The foregoing and other objects are accomplished by providing an electromagnetically operated shutter mechanism, according to the present invention, that will function in cryogenic environments to selectively block ambient radiation such as light from passing through a window to a target object such as a mirror located inside a cryogenic container such as a dewar which includes a shutter paddle blade that is moved by an electromagnetically actuated torquing device between an open position where the target object is exposed to ambient radiation and a closed position where the shutter paddle blade shields the ambient radiation from the target object. The shutter paddle blade also provides an identical cold temperature as the target object surface that is being shielded.

In its preferred embodiment, the mechanism essentially comprises an electromagnetically actuated shuttering device that is mounted inside a container such as a dewar that is cooled to very cold temperatures by a liquid cryogen such as liquid helium. The purpose of the shuttering device is to prevent a mirror or other target object from being directly exposed to ambient radiation such as light passing through a window located on the side wall of the dewar, thereby decreasing or eliminating any temperature gradient that would occur within the target object due to exposure to the radiation. A copper shutter paddle blade is mounted upon a rotatable shaft, which moves the blade back and forth between an open position in which the mirror or target object is directly exposed to the ambient radiation, and a closed position wherein the paddle blade shields the mirror from direct exposure to the ambient radiation. Permanent magnets are affixed to the periphery of the rotatable shaft and a magnet coil surrounds or encircles the shaft and permanent magnets creating an electromagnetic system when electrical current is applied to the magnet coil. The paddle blade will rotate back and forth between the opened and closed positions whenever the current applied to the magnet coil is reversed. Mechanical stops placed in the path of movement of the blade prevent the blade from over rotating beyond the open and closed positions. The rotatable shaft is positioned within an aluminum housing and is supported in two places by special nylon bearings which are split to ensure that the device will perform during conditions where cryogenic contraction of the aluminum housing occurs. The paddle blade is also thermally connected or strapped to a cold plate affixed to the cryogenic reservoir by way of a braided copper strap which aids in maintaining the paddle blade at a lower temperature.

BRIEF DESCRIPTION OF THE DRAWINGS

FIG. 6 is a view of the torquer blade in the closed position.

DETAILED DESCRIPTION OF THE PREFERRED EMBODIMENT

Figure 2:
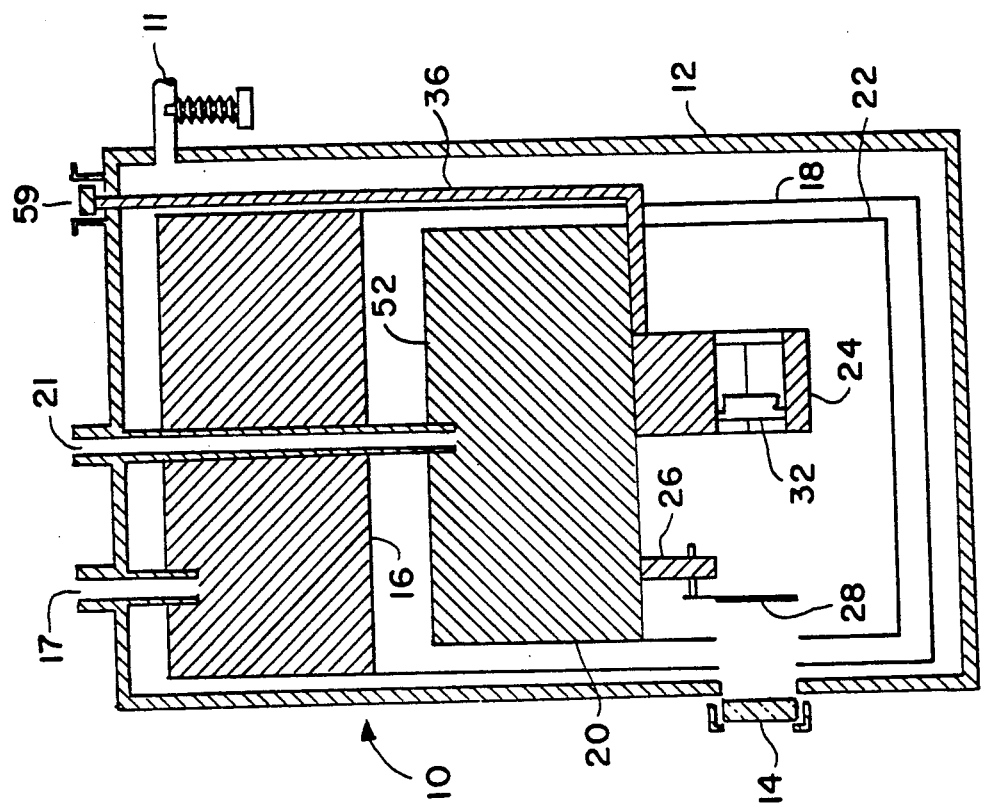
FIG. 2 is a cross-sectional view of the dewar mechanism taken along line 2—2 of FIG. 1.
Figure 1:
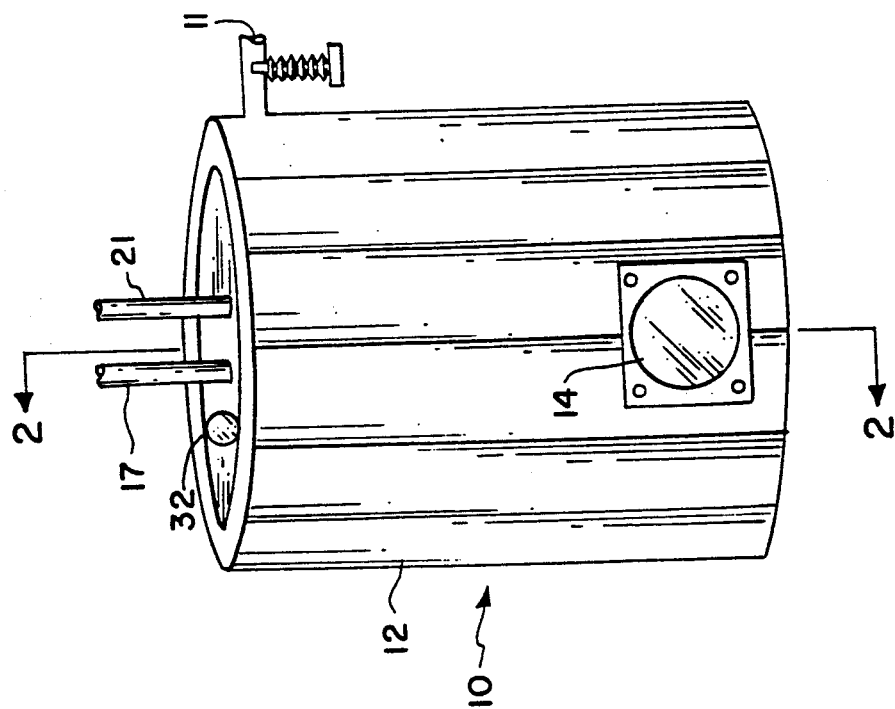
FIG. 1 is a plan view of the dewar mechanism.

The container or dewar for the preferred embodiment of this invention is shown generally at 10 in FIGS. 1 and 2. The dewar is comprised of vacuum shell 12 having a window 14 installed into vacuum shell 12. Dewar 10 is evacuated through duct 11. Window 14 is a very flat and homogeneous quartz glass, interferometric grade window in the preferred embodiment; however, for detector applications, the window 14 would be made of a suitable transmitting optical glass. Located within the vacuum shell 12 is a liquid nitrogen reservoir 16 which has a nitrogen shroud 18 mounted beneath the nitrogen reservoir 16. Nitrogen is supplied to reservoir 16 utilizing duct 17. A helium reservoir 20, including a helium shroud 22 affixed to its underside, is mounted within nitrogen shroud 18. Helium is supplied to reservoir 20 utilizing duct 21. Located within the helium shroud 22 are the cryogenic shutter mechanism 26 and mirror 32 which is affixed to mirror mount 24. Cryogens other than helium and nitrogen may also be utilized in this system.

Figure 3:
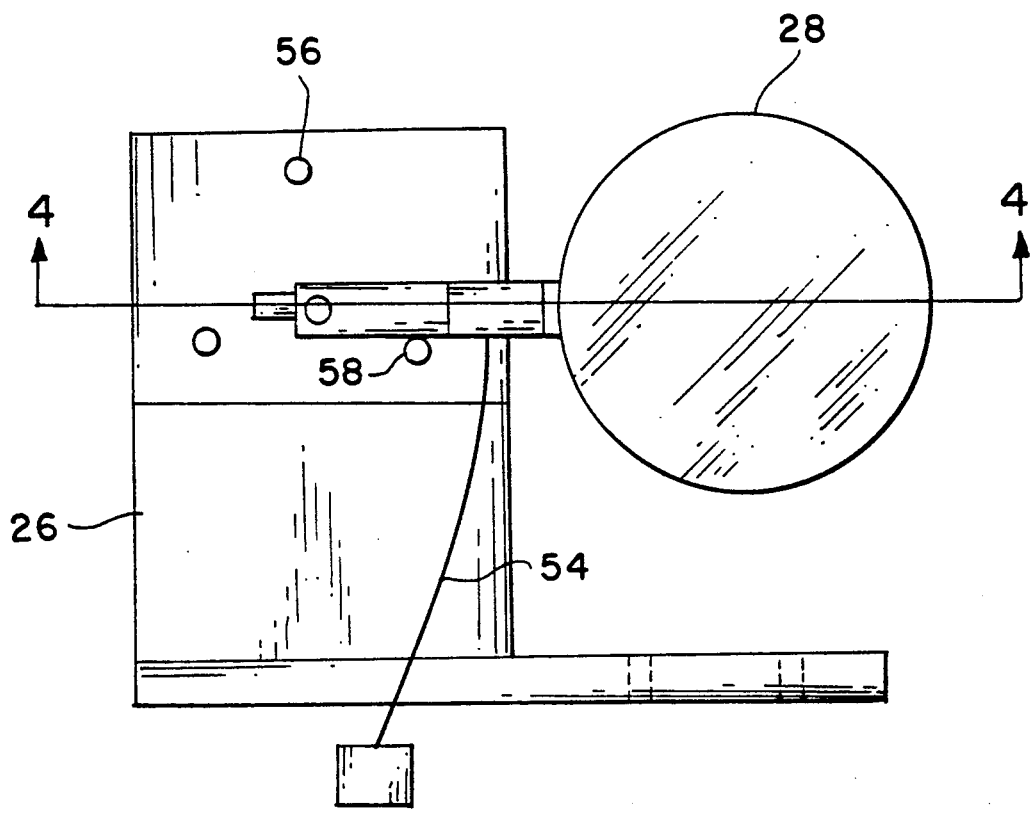
FIG. 3 is a front view of the cryogenic shutter isolated from the dewar.
Figure 5A:
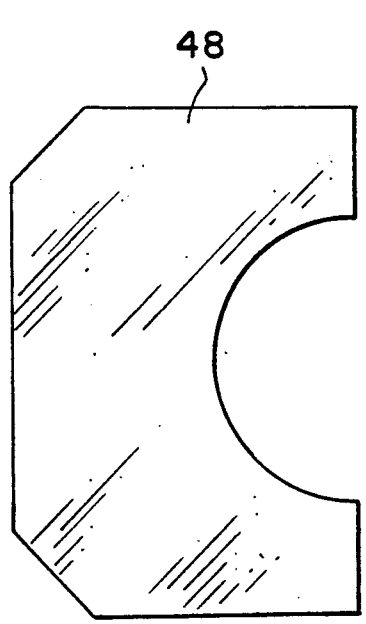
FIG. 5a is a front view of the nylon split bearing.
Figure 5B:
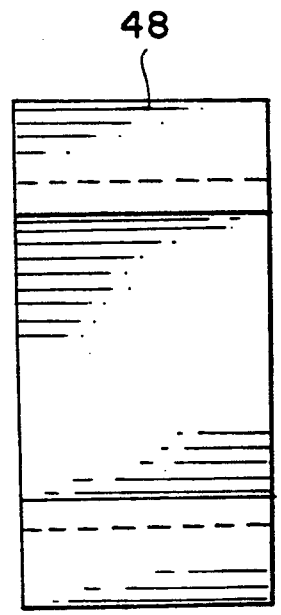
FIG. 5b is a side view of the nylon split bearing.
Figure 4:
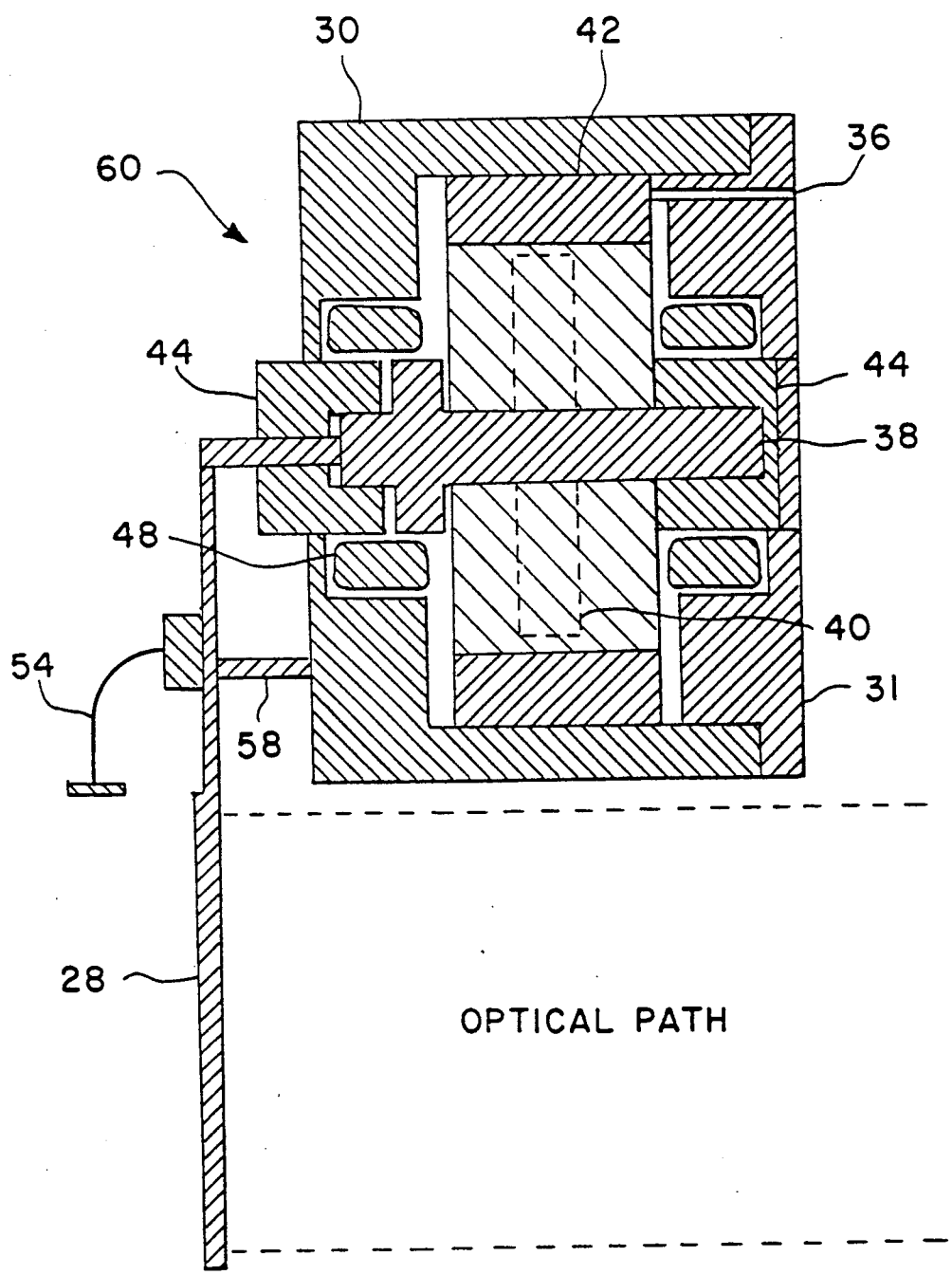
FIG. 4 is a cross-sectional view of the cryogenic shutter taken along line 4—4 of FIG. 3.

Referring to FIGS. 2, 3 and 4 the cryogenic shutter mechanism is shown generally at 26 which is the main housing for the shutter. The shutter mechanism 26 uses the concept of a magnetic torquer to orient a copper paddle or blade 28 either in the open position (where the mirror 32 is directly exposed to radiation as viewed from the window 14) or in the closed position (where the mirror 32 is blocked from the direct exposure of radiation via window 14 by paddle blade 28). Paddle blade 28 is bolted to torquer shaft 38 which runs through the torquer mechanism 26; paddle blade 28 is also mechanically aligned with torquer shaft 38 by precision retainers 44. Paddle blade 28 is also thermally strapped to a helium cold plate 52 as shown in FIG. 2 by braided copper strap 54 as shown in FIG. 4. By thermally strapping or connecting paddle blade 28 to helium cold plate 52, the temperature of paddle blade 28 is reduced as heat transfers away from paddle blade 28 to the lower temperature heat sink cold plate 52. Mechanical stops 56 and 58 as shown in FIG. 3 confine the movement of paddle blade 28 within the area defined by the open and closed positions, but note that paddle blade 28 has the capability to rotate 360 degrees if mechanical stops 56 and 58 were removed and the control electronics were modified. Torquer shaft 38 is mounted inside housing 60; housing 60 is made of aluminum that is precision machined in the preferred embodiment and has a separate front section 30 and a rear section 31 as shown in FIG. 4. Housing 60 also has low friction bearings 48 which restrain torquer shaft 38 in two places. Bearings 48 are strategically placed around torquer shaft 38 to allow for appropriate differential contraction between aluminum housing 60 and torquer shaft 38, which helps to maintain proper shaft alignment at cryogenic temperatures. In the preferred embodiment bearings 48 are split in half (as is illustrated in FIGS. 5a and 5b) to allow for the differential contraction. Low friction bearings 48 are made of a plastic material such as nylon. The characteristics of material and the allowance for differential contractions make bearings 48 low friction.

A magnet 40 (shown in FIG. 4) is attached or coupled to torquer shaft 38. The magnet 40 is a windmill-shaped permanent magnet in the preferred embodiment. Surrounding or encircling magnet 40 is a magnet coil 42 inside of which magnet 40 rotates between two positions, which correspond to the open and closed positions for the paddle blade 28. Bearings 48 are also utilized to center torquer magnet 40 within magnet coil 42. Magnet coil 42 is energized by electrical current which is supplied from an outside source via insulated lead wires 36 which enter the dewar shell 12 at opening or electrical duct 59, as shown in FIG. 2. When electrical current is applied to magnet coil 42, the current running through magnet coil 42 changes the magnetic field poles of magnet coil 42 which causes magnet 40 to rotate and thereby change the position of paddle blade 28. In the preferred embodiment it required approximately 0.5 ampere at 10 volts to energize the magnet coil 42 at ambient temperature conditions, and it required approximately 0.3 ampere at 8 volts to energize the magnet coil 42 at cryogenic temperature conditions.

Figure 7:
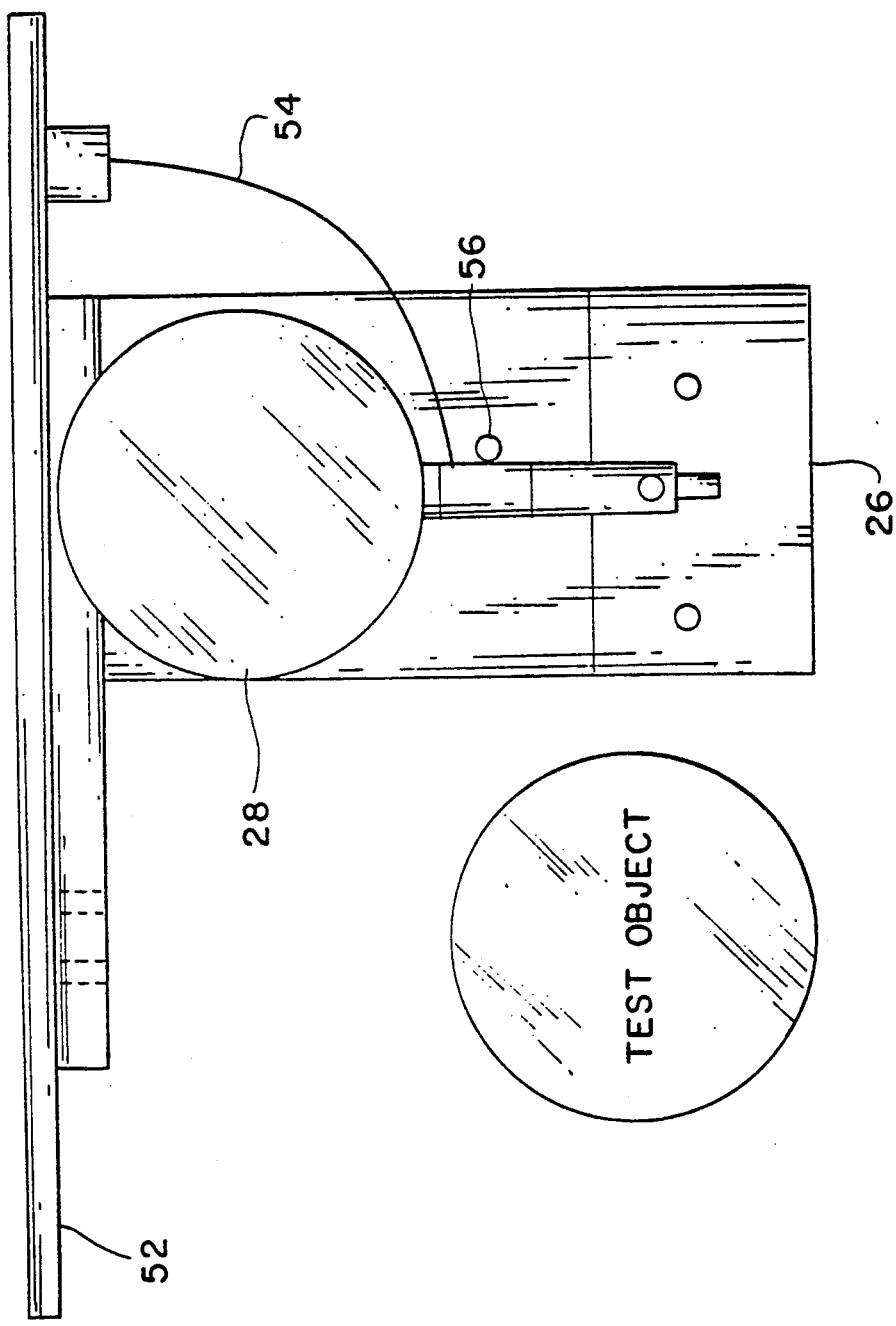
FIG. 7 is a view of the torquer blade in the open position.

In operation the torquer paddle blade 28 will rotate approximately but less than 90 degrees in one direction by applying a current through the torquer coil 42. If the direction of the current is reversed, paddle blade 28 rotates the same amount of displacement in the reverse direction. The mechanical stops 56 and 58 are located at the open and closed positions, respectively. The force of gravity keeps paddle blade 28 in the closed position as is shown in FIG. 6. When current is applied, paddle blade 28 moves to the open position and the blade 28 will strike stop 56 which prevents over rotation of blade 28 as is shown in FIG. 7. It requires much less electrical power to maintain paddle blade 28 in the open position than it does to move the paddle. At ambient temperatures, paddle blade 28 will fall to the closed position if the electrical power is disconnected. At cryogenic temperatures, with no electrical power applied to torquer coil 42, there is enough mechanical resistance in the device to maintain the shutter blade 28 in the open position. The paddle blade 28 is closed by driving it shut by reversing the current. This effect is advantageous at cryogenic temperatures because it minimizes the thermal input to dewar 10 caused by electrical heating when operating the shutter mechanism. When operating at cryogenic zero gravity conditions, super conductive wire should also be used to maintain a small amount of current in the circuit to hold paddle blade 28 in the open position.

By providing the cryogenic shutter system as is disclosed herein, it is now possible to operate a cryogenic moveable shield in any cold environment or cryogenic zero gravity environment, to decrease or eliminate temperature gradients in objects functioning in those environments, and to check the characteristics of cryogenic optical elements or cryogenic mechanisms operating in those environments.

It will be understood by those skilled in the art that the embodiments shown and described are only exemplary and that various modifications can be made in the practice of the invention within the scope of the appended claims.

What is claimed is:

1. A shutter mechanism that will operate in a cryogenic or cryogenic zero gravity environment to selectively block radiation from passing through a window mirror comprising:
    a shutter mount affixed to a cryogenic plate located within said cryogenic environment;
    a shutter blade member having one end coupled to said shutter mount and also located within said cryogenic environment; and
    driving means for moving said shutter blade member between an open position and a closed position, wherein said shutter blade member is thermally coupled to said cryogenic plate.

2. The mechanism as recited in claim 1 wherein said driving means is a magnetic torquer device.

3. The mechanism as recited in claim 2 wherein said magnetic torquer device comprises:
    a torquer element or shaft located in a housing;
    a magnet coupled to said shaft;
    a magnet coil surrounding said magnet; and
    means for energizing said magnet coil.

4. The mechanism as recited in claim 3 wherein said torquer shaft is mounted upon low friction bearings.

5. The mechanism as recited in claim 4 wherein said bearing are split or separated to insure performance during cryogenic contraction of said housing.

6. The mechanism as recited in claim 5 wherein said bearing are made of nylon material.

7. The mechanism as recited in claim 3 wherein said mechanism further includes a stop means for limiting the movement of said shutter blade member between said open position and said closed position.

8. The mechanism as recited in claim 7 wherein a braided copper strap is utilized to thermally couple said shutter blade member.

9. The mechanism as recited in claim 8 wherein said torquer shaft is mechanically aligned within said housing by precision retainers and said low friction split bearings.

* * * * *